(12) United States Patent
Hauser et al.

(10) Patent No.: US 10,507,801 B2
(45) Date of Patent: Dec. 17, 2019

(54) WINDSCREEN WIPING DEVICE

(71) Applicant: Robert Bosch GmbH, Stuttgart (DE)

(72) Inventors: Florian Hauser, Achern (DE); Michael Weiler, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 478 days.

(21) Appl. No.: 15/115,147

(22) PCT Filed: Dec. 23, 2014

(86) PCT No.: PCT/EP2014/079139
§ 371 (c)(1),
(2) Date: Jul. 28, 2016

(87) PCT Pub. No.: WO2015/113715
PCT Pub. Date: Aug. 6, 2015

(65) Prior Publication Data
US 2016/0347284 A1 Dec. 1, 2016

(30) Foreign Application Priority Data
Feb. 3, 2014 (DE) .......................... 10 2014 201 829

(51) Int. Cl.
*B60S 1/34* (2006.01)
*B60S 1/38* (2006.01)
(52) U.S. Cl.
CPC ........... *B60S 1/3452* (2013.01); *B60S 1/3801* (2013.01); *B60S 2001/3898* (2013.01)
(58) Field of Classification Search
CPC ............................... B60S 1/3452; B60S 1/345
See application file for complete search history.

(56) References Cited

U.S. PATENT DOCUMENTS 1,888,665 A 11/1932 Herlbauer et al.
3,131,414 A 5/1964 Wise
(Continued)

FOREIGN PATENT DOCUMENTS

CN 1671581 A 9/2005
CN 1816473 A 8/2006
(Continued)

OTHER PUBLICATIONS

WO2006032388A1 (machine translation) (Year: 2006).*
(Continued)

*Primary Examiner* — Andrew A Horton
(74) *Attorney, Agent, or Firm* — Michael Best & Friedrich LLP (57) ABSTRACT

The present invention relates to a windscreen wiping device (40, 50) for a vehicle having an attachment element, in particular a motor vehicle. The windscreen wiping device (40, 50) comprises a mounting unit (41, 60) which is designed to be mounted on the attachment element, wherein the mounting unit (41, 60) has a first engagement element (42, 61), and a wiper blade (2) having an elongate upper part (10) and an elongate lower part (12) that are designed to be flexible at least in part. Also provided are a plurality of connecting elements (18) for connecting the upper part (10) and the lower part (12), wherein the connecting elements (18) are spaced apart from one another along a longitudinal extension (8) of the wiper blade (2). The connecting elements (18) are designed to permit a movement of the upper part (10) and of the lower part (12) relative to one another with a movement component along a longitudinal extension (8) of the wiper blade (2). Furthermore, the wiper blade (2) comprises an attachment part (43, 51) on the wiper blade, wherein the attachment part (43, 51) on the wiper blade has a second engagement element (44, 52), and wherein the first (Continued)

engagement element (42, 61) and the second engagement element (44, 52) can be introduced one into the other by a movement substantially perpendicular to the longitudinal extension (8).

6 Claims, 4 Drawing Sheets

(56) References Cited

U.S. PATENT DOCUMENTS

| | | | |
|---|---|---|---|
| 3,939,525 A | 2/1976 | Stratton | |
| 5,623,742 A | 4/1997 | Journee et al. | |
| 6,301,742 B1 * | 10/2001 | Kota | B60S 1/32 15/250.361 |

FOREIGN PATENT DOCUMENTS

| | | | |
|---|---|---|---|
| DE | 4324783 | 1/1995 | |
| DE | 102004008617 | 9/2005 | |
| DE | 202004012549 | 12/2005 | |
| DE | 102005008635 A1 * | 8/2006 | ............ B60S 1/3452 |
| EP | 1486389 | 12/2004 | |
| FR | 2181101 A5 | 11/1973 | |
| GB | 2146239 | 4/1985 | |
| KR | 100782794 B1 | 12/2007 | |
| WO | WO-2006032388 A1 * | 3/2006 | ............ B60S 1/3413 |
| WO | 2014072186 A1 | 5/2014 | |

OTHER PUBLICATIONS

DE102005008635A1 (machine translation) (Year: 2006).*
International Search Report for Application No. PCT/EP2014/079139 dated Apr. 15, 2015 (English Translation, 3 pages).

* cited by examiner

WINDSCREEN WIPING DEVICE

BACKGROUND OF THE INVENTION

The invention concerns a windshield wiping device for a vehicle, especially a motor vehicle, and concerns a method for the mounting of a windshield wiping device on a fastening element of a vehicle.

Windshield wiping devices typically have a wiper arm or wiper lever, wherein a wiper blade, on which a wiper lip is attached, is moved on the window of a motor vehicle. The wiper arm is moved alternating between a first turning point and a second turning point. For this purpose, the wiper arm is connected via the drive shaft to a wiper motor.

There are many boundary conditions which need to be considered for the improvement of windshield wiping devices. These include the expense during the manufacture or the manufacturing costs, the material costs, but also the properties of the windshield wiping device, especially its function under various conditions and the service life under a variety of conditions. A factor to be considered in wiping devices for vehicles is that the cost pressure is constantly increasing and that the vehicles may come to be used in a variety of climatic conditions, so that extreme temperatures may occur in constant manner and/or with great fluctuations, for example.

Therefore, there is a need to further improve windshield wiping devices, especially in terms of cost efficiency.

The problem which the present invention proposes to solve is to provide a windshield wiping device with which at least one or more of the aforementioned drawbacks is lessened or essentially does not occur.

SUMMARY OF THE INVENTION

According to one aspect of the present invention a windshield wiping device is proposed for a vehicle with a fastening element, especially a motor vehicle. The windshield wiping device comprises a mounting unit, which is designed to be mounted on the fastening element, wherein the mounting unit has a first engagement element, and a wiper blade. The wiper blade comprises an elongated upper part, which is at least partly bendable, an elongated lower part, which is at least partly bendable, several connection elements for connecting the upper part and the lower part, wherein the connection elements are spaced apart from each other along a lengthwise dimension of the wiper blade, and wherein the connection elements are designed to enable a movement of the upper part and the lower part relative to each other with a movement component along a lengthwise dimension of the wiper blade. The wiper blade further comprises a fastening part at the wiper blade side, wherein the wiper blade-side fastening part has a second engagement element, and wherein the first engagement element and the second engagement element can be introduced one into the other by a movement essentially perpendicular to the lengthwise dimension.

According to another aspect of the present invention, a method is provided for the mounting of a windshield wiping device. The method involves providing a windshield wiping device according to the embodiments described herein. Furthermore, the method involves introducing the first engagement element and the second engagement element into one another by a movement essentially perpendicular to the lengthwise dimension of the wiper blade.

According to the windshield wiping device described herein, according to embodiments described herein and by the method for mounting the windshield wiping device, a windshield wiping device is provided which can be mounted and dismounted in easy manner, and which is economical in its manufacture and upkeep. The wiper blade of the windshield wiping device, which is preferably of the fin ray type, is mounted with a single movement ("one click") on the mounting unit and dismounted therefrom. Accordingly, the wiper blade can be easily replaced especially in the case of damage or showing signs of wear, or removed in easy fashion before driving through a car wash and then be mounted back in place. Moreover, the windshield wiping device can be produced easily and economically.

According to embodiments of the disclosure, the windshield wiping device has a mounting unit which is designed to be mounted on the fastening element of the vehicle, wherein the mounting unit has a first engagement element. Moreover, the windshield wiping device has a wiper blade with a fastening part at the wiper blade side, wherein the wiper blade-side fastening part has a second engagement element, and wherein the first engagement element and the second engagement element can be introduced one into the other by a movement essentially perpendicular to the lengthwise dimension. Thus, by a single movement, the wiper blade can be attached to the mounting unit. Moreover, the windshield wiping device can be produced easily and economically.

In typical embodiments, the first engagement element and the second engagement element are designed to form a positive engagement and/or a force closure. In this way, the wiper blade and the mounting unit can be easily joined to each other in stable fashion, and in particular they can be joined to each other in detachable manner. For example, the mounting unit in certain embodiments can comprise an activating device, which is designed to make and/or break the force closure and/or positive engagement.

According to embodiments of the disclosure, the first engagement element and the second engagement element are designed essentially in dovetail manner. Thanks to this, a positive engagement for example can be produced in simple manner, which in particular prevents a movement of the wiper blade in the direction of its lengthwise dimension and holds it in its relative position to the mounting unit.

In typical embodiments, the mounting unit further has a mounting element, wherein the second engagement element of the fastening part at the wiper blade side after being inserted is positioned between the first engagement element and the mounting element. For example, the force closure and/or positive engagement between the first engagement element and the second engagement element and/or between the second engagement element and the mounting element can be brought about by a movement of the first engagement element relative to the mounting element in a direction which is essentially perpendicular to the lengthwise dimension of the wiper blade, and which is essentially perpendicular to the direction of the movement by which the first engagement element and the second engagement element can be introduced one into the other. In particular, the second engagement element can be arranged between the mounting element and the first engagement element, so that by pressing or forcing the first engagement element against the second engagement element the latter is pressed or forced against the mounting element in order to produce a force closure.

According to some embodiments, the mounting unit can further comprise a connection element which joins together the first engagement element and the mounting element. In this way, a force transmission can occur between the first engagement element and the mounting element, for example in order to hold the second engagement element between the first engagement element and the mounting element by force closure.

In typical embodiments, the connection element is U-shaped. For example, one leg of the U-shaped connection element can be inserted into the first engagement element, and/or another leg of the U-shaped connection element can be inserted into the mounting element. The first engagement element and the mounting element can each comprise suitable recesses or cutouts which enable an inserting of the respective leg. Thus, in particular, the mounting element of the windshield wiping device can be manufactured easily and economically.

According to some embodiments, the first engagement element is cylindrical in form, and the second engagement element is essentially a half-shell. This enables an easy insertion of the first engagement element into the second engagement element, or the second engagement element into the first engagement element, and enables in particular a positive engagement between the first engagement element and the second engagement element.

In typical embodiments, one leg of the U-shaped connection element can be inserted into the first engagement element at a distance from its cylinder axis. In this way, an eccentric mechanism can be provided, which can be used for example to produce the force closure and/or positive engagement.

In many embodiments, the force closure and/or positive engagement between the first engagement element and the second engagement element and/or between the second engagement element and the mounting element can be produced by a rotation of the first engagement element about the cylinder axis. Especially when the mounting unit comprises the above-described eccentric mechanism, the force closure and/or positive engagement can be produced by the rotation of the first engagement element about the cylinder axis, for example.

BRIEF DESCRIPTION OF THE DRAWINGS

Sample embodiments of the invention are presented in the figures and shall be described more closely below. There are shown.

DETAILED DESCRIPTION

In the following, unless otherwise noted, the same reference symbols shall be used for identical and similar functioning elements.

Figure 1A:
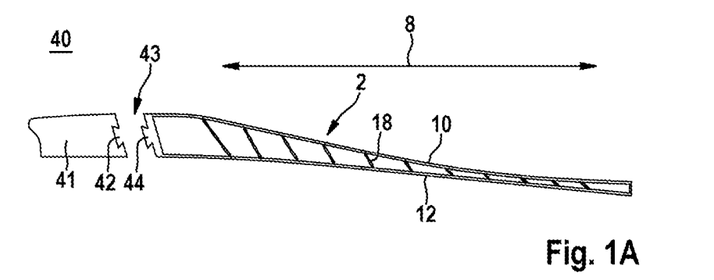
FIG. 1A, a schematic representation of a windshield wiping device according to embodiments of the disclosure in an unfastened state, FIG. 1B, a schematic representation of the windshield wiping device of FIG. 1A according to embodiments of the disclosure in a fastened state, FIG. 2, a perspective view of the windshield wiping device of FIGS. 1A and 1B according to embodiments of the disclosure in an unfastened state, FIG. 3A, a schematic representation of a windshield wiping device according to embodiments of the disclosure in an unfastened state, FIG. 3B, a schematic representation of the windshield wiping device of FIG. 3A according to embodiments of the disclosure in a fastened state, FIG. 4, a schematic representation of a mounting unit of the windshield wiping device according to embodiments of the disclosure, FIG. 5A, a schematic representation of another sample embodiment of a windshield wiping device according to the invention in the form of a wiper arm with integrated wiper blade in a bottom position, FIG. 5B, a schematic representation of the wiper arm with integrated wiper blade of FIG. 5A in a position placed against a window, and FIG. 6, a schematic perspective representation of a wiper arm of a windshield wiping device according to embodiments of the disclosure, FIG. 7, a flow chart to illustrate embodiments of the method for mounting a windshield wiping device according to embodiments of the disclosure.
Figure 1B:
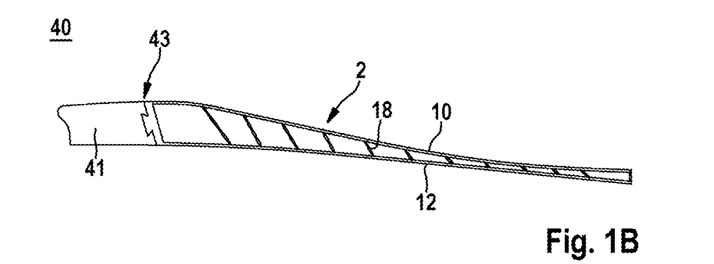

FIGS. 1A and 1B show schematically a windshield wiping device 40 according to embodiments of the disclosure. FIG. 1A shows the windshield wiping device 40 in an unfastened state and FIG. 1B shows the windshield wiping device 40 of FIG. 1A in a fastened state.

According to embodiments of the disclosure, the windshield wiping device 40 comprises a fin ray structure, a wiper blade 2 with a fastening part 43 at the wiper blade side, and a mounting unit 41.

According to embodiments of the disclosure, the windshield wiping device 40 comprises the wiper blade 2 with an elongated upper part 10 and an elongated lower part 12, which are at least partly bendable. Furthermore, several connection elements 18 are provided for connecting the upper part 10 and the lower part 12, wherein the connection elements 18 are spaced apart from each other along a lengthwise dimension 8 of the windshield wiping device 40. The connection elements 18 are designed to enable a movement of the upper part 10 and the lower part 12 relative to each other with a movement component along a lengthwise dimension 8 of the windshield wiping device 40.

According to embodiments of the disclosure, the windshield wiping device 40 has a mounting unit 41. Typically, the mounting unit 41 is designed to be mounted on a fastening element of a vehicle, such as a drive axle of a wiper drive unit. The mounting unit 41 has the first engagement element 42. Moreover, the windshield wiping device 40 has the wiper blade 2 with the fastening part 43 at the wiper blade side, wherein the wiper blade-side fastening part 43 has a second engagement element 44. The first engagement element 42 and the second engagement element 44 can be introduced one into the other by a movement essentially perpendicular to the lengthwise dimension 8 of the wiper blade 2. In this way, the wiper blade 2 can be fastened on the mounting unit 41 by a single movement. Moreover, the windshield wiping device 40 can be produced easily and economically.

In typical embodiments, the first engagement element 42 and the second engagement element 44 are designed to form a positive engagement and/or force closure. In this way, the wiper blade 2 and the mounting unit 41 are easily joined together in stable manner, and in particular they can be joined together in detachable manner. In some embodiments, for example, the mounting unit 41 can comprise an activating device, which is designed to make and/or break the force closure and/or positive engagement.

According to embodiments of the disclosure, which can be combined with other embodiments, by "force closure" is meant all connections which arise by the transmission of forces (such as force closure connections, frictional connection). In particular, such connections employ pressure forces and/or frictional forces. These connections are held together by the acting force.

According to embodiments of the disclosure, which can be combined with other embodiments, by "positive engagement" is meant all connections which arise by an interlocking of at least two elements (positive engagement connections). In particular, the elements cannot be loosened by the mechanical connection even with or without interrupted transmission of force.

According to embodiments of the disclosure, the first engagement element 42 and the second engagement element 44 are designed essentially in dovetail manner, as is shown in FIGS. 1A and 1B. In this way, one can accomplish a positive engagement for example in simple fashion, which in particular hinders a movement of the wiper blade 2 in the direction of its lengthwise dimension 8 and holds it in its relative position to the mounting unit 41.

Figure 2:
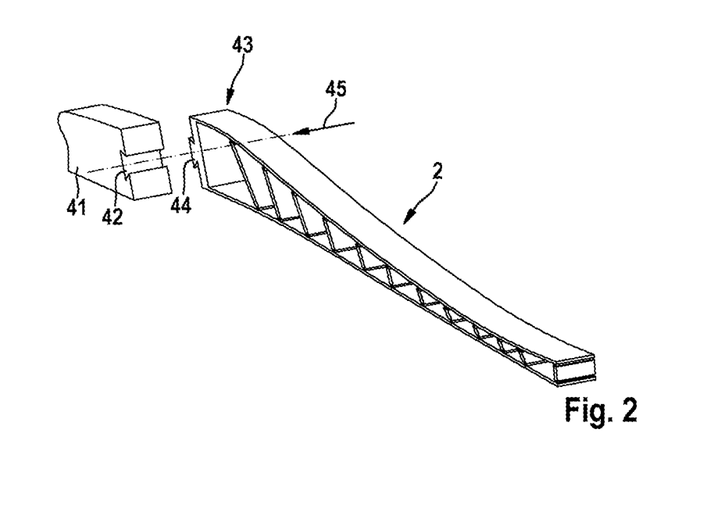

FIG. 2 shows a perspective view of the windshield wiping device of FIGS. 1A and 1B according to embodiments of the disclosure in an unfastened state.

As indicated by the arrow 45 in FIG. 2, the first engagement element 42 and the second engagement element 44 can be inserted one into the other by a movement essentially perpendicular to the lengthwise dimension 8 of the wiper blade 2. Thus, by a single movement the wiper blade 2 can be fastened on the mounting unit 41. Moreover, the windshield wiping device 40 can be produced easily and economically.

Figure 3A:
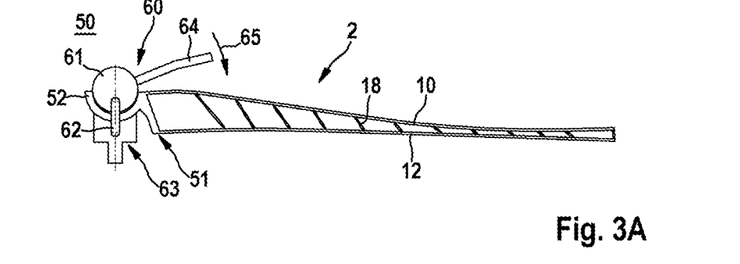
Figure 3B:
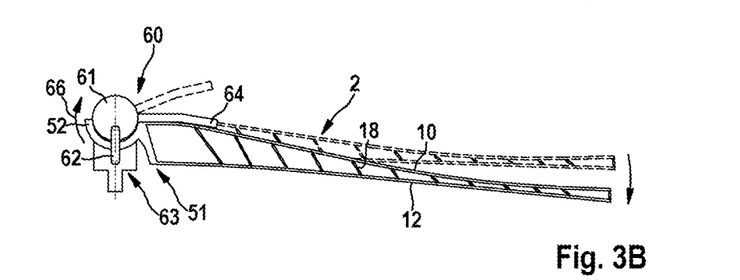
Figure 4:
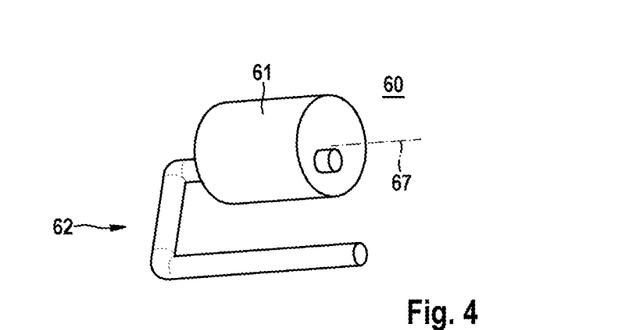

FIG. 3A is a schematic representation of a windshield wiping device 50 according to embodiments of the disclosure in an unfastened state, and FIG. 3B is a schematic representation of the windshield wiping device of FIG. 3A according to embodiments of the disclosure in a fastened state. FIG. 4 shows a schematic representation of a mounting unit 60 of the windshield wiping device according to embodiments of the disclosure.

In typical embodiments, the mounting unit 60 has a mounting element 63. The mounting element 63 can be provided in or on a shaft region, such as a drive shaft of a wiper drive unit of a vehicle. The mounting element 63 can be designed such that the second engagement element 52 of the fastening part 51 at the wiper blade side after being inserted is positioned between the first engagement element 61 and the mounting element 63. This is shown, for example, in FIGS. 3A and 3B. For example, the force closure and/or positive engagement between the first engagement element 61 and the second engagement element 52 and/or between the second engagement element 52 and the mounting element 63 can be brought about or formed by a movement of the first engagement element 61 relative to the mounting element 63 in a direction which is essentially perpendicular to the lengthwise dimension of the wiper blade 2, and/or which is essentially perpendicular to the direction of the movement by which the first engagement element 61 and the second engagement element 52 can be introduced one into the other. In particular, the second engagement element 52 can be arranged between the mounting element 63 and the first engagement element 61, so that by pressing or forcing the first engagement element 61 against the second engagement element 52 the latter is pressed or forced against the mounting element 63 in order to produce a positive engagement and/or force closure.

According to typical embodiments of the disclosure, the mounting unit 60 comprises an eccentric mechanism, which is designed to make and/or break the force closure and/or positive engagement.

According to certain embodiments, the mounting unit 60 can further comprise a connection element 62 by which the first engagement element 61 and the mounting element 63 can be joined together. In this way, a force transmission can occur between the first engagement element 61 and the mounting element 63, for example in order to hold the second engagement element 52 between the first engagement element 61 and the mounting element 63 by force closure.

In typical embodiments, the connection element 62 is U-shaped (see in particular FIG. 4). The U-shaped connection element 62 can also be called a "U-pin". For example, one leg of the U-shaped connection element 62 can be inserted into the first engagement element 61, and/or another leg of the U-shaped connection element 62 can be inserted into the mounting element 63. The first engagement element 61 and the mounting element 63 can each comprise suitable recesses, holes, grooves or cutouts which enable an inserting of the respective leg. Thus, in particular, the mounting element 61 of the windshield wiping device 50 can be manufactured easily and economically.

According to some embodiments, the first engagement element 61 is cylindrical in form with a first radius (FIG. 4), and the second engagement element 52 is essentially a shell or a half-shell with a second radius. The first radius and the second radius can be essentially identical. This enables an easy insertion of the first engagement element 61 into the second engagement element 52, or the second engagement element 52 into the first engagement element 61, and enables in particular a positive engagement between the first engagement element 61 and the second engagement element 52.

In typical embodiments, and as is shown in FIG. 4, one leg of the U-shaped connection element 62 can be inserted into the first engagement element 61 at a distance from its cylinder axis 67. In this way, according to typical embodiments, an eccentric mechanism can be provided, which can be used for example to produce the force closure and/or positive engagement.

In many embodiments, the force closure and/or positive engagement between the first engagement element 61 and the second engagement element 52 and/or between the second engagement element 52 and the mounting element 63 can be produced by a rotation of the first engagement element 61 about the cylinder axis 67. Especially when the mounting unit 60 comprises the above-described eccentric mechanism, the force closure and/or positive engagement can be produced by the rotation of the first engagement element 61 about the cylinder axis 67, for example.

For example, the mounting unit 60 in certain embodiments can comprise an activating device 64, which is designed to make and/or break the force closure and/or positive engagement. In the example of FIGS. 3A and 3B, the activating device 64 of the mounting unit 60 is designed as a lever. The lever is designed to produce a rotation of the first engagement element 61 about the cylinder axis 67, by which the force closure and/or positive engagement can be produced or released between the first engagement element 61 and the second engagement element 52 and/or between the second engagement element 52 and the mounting element 63. In particular, the activating device 64 can be designed to activate the eccentric mechanism of the mounting unit 60 (eccentric cam with lever).

According to the embodiment of FIGS. 3A and 3B, a fastening is accomplished through a shell design by means of an eccentric lever on the shaft. In this way, a settling behavior of the structure can be compensated in that the structural region (the wiper blade) is rotated and then once again tensioned for example by means of an eccentric lever. A U-pin (connection element) which is led in a borehole at the shaft region (mounting element) can serve as a possible eccentric lever attachment.

Thus, thanks to the embodiments described herein a windshield wiping device is provided which can be mounted and dismounted in easy fashion. Accordingly, the windshield wiping device in the event of damage can be easily replaced, or before driving through a car wash it can be easily removed and then put back in place. Moreover, the windshield wiping device according to the embodiments described here can be produced easily, economically, and with low material outlay.

A wiper based on the fin ray principle consists of two parts: a head region (mounting unit), which is arranged on the drive shaft, and a flexible structural region (wiper blade). This produces the following advantages: the weight of the part being replaced during a servicing is less than that of the solution with integrated head, so that a more prudent use of resources and more favorable costs are achieved. Further, an economical manufacturing is possible thanks to the shape of the structural region with no undercuts (injection molding without a gate or extruded profile, i.e., extruded structural region, are possible). According to embodiments, an extruded attachment (shoving in) at the head region, e.g., with dovetail design, thus becomes possible for example.

In the following, sample embodiments of wiper systems shall be described, for which the windshield wiping device described herein can be used advantageously. Basically, however, the fastening device described herein can also be used for other windshield wiping devices.

Figure 5A:
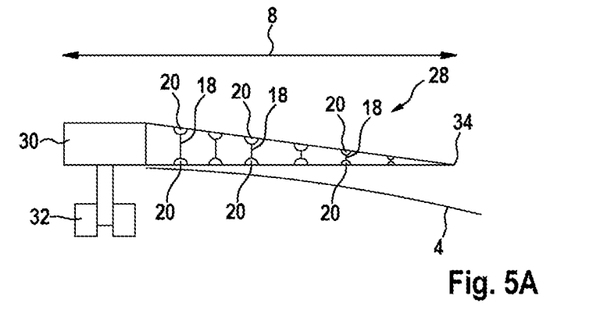
Figure 5B:
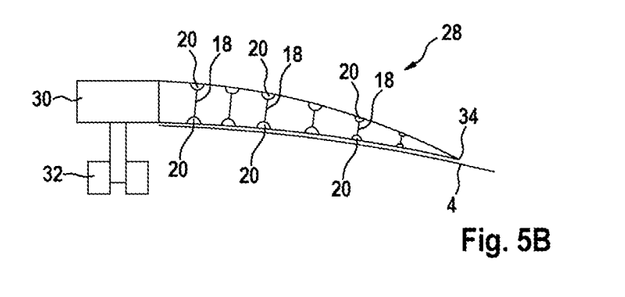

FIGS. 5A and 5B show schematic representations of a wiper blade 2 in a bottom position (FIG. 5A) and in a position (FIG. 5B) placed against a window 4 according to embodiments of the windshield wiping device of the disclosure. The wiper blade 2 serves to wipe a window 4 of a vehicle, which is for example a motor vehicle, especially a car. Usually the wiper blade 2 is placed on a window wiping arm, which is driven by means of a motor for the wiping. For this, the wiper blade 2 has a support, at which it can be fastened on the window wiping arm. The wiper blade 2 in FIG. 5A is in the bottom position, in which it is at least partly lifted from the window 4. The wiper blade 2 has a lengthwise dimension 8 and an elongated upper part 10 and a likewise elongated lower part 12. The lengthwise dimensions of the upper part 10 and the lower part 12 basically correspond to the lengthwise dimension 8 of the wiper blade 2.

Both the upper part 10 and the lower part 12 are bendable beams or can be designed as bendable beams, each of them being a single piece as an example shown in FIGS. 5A and 5B. This enables an especially stable design. It is likewise possible to respectively have only one part of the upper part 10 and/or lower part 12 being bendable. Moreover, it is alternatively possible for the upper part 10 to consist of several pieces.

According to many embodiments which can be combined with the other embodiments described here, a material is used for the upper part 10 and/or the lower part 12 which has a modulus of elasticity lying in a range between 0.005 kN/mm$^2$ and 0.5 kN/mm$^2$, especially 0.01 kN/mm$^2$ and 0.1 kN/mm$^2$. This enables a suitable bendability of the upper part 10 and the lower part 12. Together with a suitably designed cross-sectional area of the upper part 10 and the lower part 12, one thus gets an optimal bendability. The upper part 10 and the lower part 12 are disposed so that they lie opposite each other. One end of the upper part 10 is firmly connected at an outer connection position 34 to one end of the lower part 12. Otherwise, the upper part 10 and the lower part 12 are spaced apart.

The upper part 10 and the lower part 12 are joined together by connection elements 18. In particular, in the bottom position of the wiper blade 2, these extend roughly transversely to the lengthwise dimension 8 of the wiper blade 2. The connection elements 18 are attached by rotary joints 19 at mutually facing inner lengthwise sides of the upper part 10 and the lower part 12. The rotary joints 19 here are hinges. In particular, the rotary joints 19 can be designed as film hinges. This is especially advantageous when upper part 10, lower part 12 and/or connection elements 18 are made from a plastic material or coated with a suitable plastic material.

According to typical embodiments described here, which can be combined with other embodiments described here, a rotary joint is chosen from the following group consisting of: a hinge, a film hinge, a narrowing of the material to produce less stiffness along a torsion axis, a joint with an axis of rotation, a means of connecting the upper part to the connection element or connecting the lower part to the connection element allowing a sliding of the lower part in relation to the upper part along the lengthwise dimension, etc.

Embodiments in which the joint is provided by a film hinge thus provide a very simple means of providing the joints for a fin ray wiper. The wiper blade 2 can be a single piece, in particular, tooled. According to typical embodiments, the windshield wiping device, especially the wiper blade, is made from one or more materials of a group consisting of: TPE (thermoplastic elastomer), such as TPE-S, TPE-O, TPE-U, TPE-A, TPE-V and TPE-E. The film hinges can have good stretchability. This can be accomplished, for example, by a material chosen from the group of PP, PE, POM and PA. Alternatively, the film hinges can be made from one or more materials of a group consisting of: TPE (thermoplastic elastomer), such as TPE-S, TPE-O, TPE-U, TPE-A, TPE-V and TPE-E.

The connection elements 18 are spaced apart from each other along the lengthwise dimension of the wiper blade 2. The distances between every two neighboring connection elements 18 are equal. But they can also be chosen to be different. The distances are advantageously less than 50 mm, especially less than 30 mm. In this way, an especially high flexibility of the windshield wiping device can be assured, especially of its lower part, and good adaptation to the curvature and changes in curvature of the window being wiped.

The connection elements 18, especially in the bottom position of the wiper blade 2, are attached to the lower part 12 such that their lengthwise axes subtend angles 26 with the lower part 12 which are between 65° and 115°, especially between 75° and 105°. Especially advantageously, the angles lie between 80° and 100°. This advantageously assures an especially good transmission of a force acting on the lower part to the upper part. Moreover, an especially stable windshield wiping device can be achieved in this way. The same holds for the attachments of the connection elements 18 to the upper part 10.

The distances between the upper part 10 and the lower part 12 are primarily determined by the lengths of the connection elements 18. The lengths of the connection elements 18 increase, starting from the outer connection position to approximately those positions at which the fastening part 20 on the wiper blade side begins. In this way, upper part 10 and lower part 12 in lateral view looking at the wiper blade 2 as per FIG. 5A form a wedge. The connection elements 18 are of buckle-proof design.

FIG. 5B shows a schematic representation of the wiper blade 2 of FIG. 5A in a position placed against the window 4. Since the window 4 has a curvature, contact pressure forces act on the lower part 12 when the wiper blade 2 is placed against the window 4. Since the upper part 10 and the lower part 12 are bendable beams and the connection elements 12 are mounted rotatably on the upper part 10 and lower part 12, the upper part 10 and lower part 12 can slide relative to each other. Thanks to the pressure forces acting on the lower part 12 from below, the wiper blade 2 bends in the direction from which the pressure forces are arriving, and adapts itself precisely to the curvature of the window 4.

Thanks to the design of the embodiments described here, when a force acts on the lower part (through the window 4) there is a bending of the lower part in the direction from which the force is acting. This is dictated by the connection of the upper part 10 and the lower part at a connection position 14 and/or 16, the shape, and rotary joints at the connection between the connection elements and the upper and lower part.

In the representation of FIG. 5B, a slight spacing is present between the wiper blade 2 and the window 4, which serves here only to illustrate the window 4 and the wiper blade 2 and is for the most part not present in reality when the wiper blade 2 bears against the window 4. Furthermore, a wiper lip is typically present at the bottom side of the lower part 12, facing away from the upper part 10, which is placed on the window 4 for the wiping process. For reasons of clarity, the wiper lip is not shown in FIGS. 5A and 5B.

A windshield wiping device according to the embodiments described here uses the tail fin effect of certain fish, which when pressure comes from the side do not give way in the direction of the pressure, but instead arch themselves in the opposite direction, i.e., the direction from which the pressure is arriving. This principle is also known as the fin jet or "fin ray" principle. Thus, a windshield wiping device according to the embodiments described herein has the advantage of a better adaptation to a window of a motor vehicle. With a traditional windshield wiping device, its upper part is usually rigid, i.e., not bendable in design.

FIGS. 5A and 5B further show a mounting unit 30, on which the wiper blade 2 is arranged. The mounting unit 30 is connected to a wiper motor 32, which drives the mounting unit 30 to wipe the window 4. The mounting unit 30 can be configured according to the embodiments of the present disclosure, and the wiper blade 2 can comprise the fastening part on the wiper blade side according to the embodiments of the present disclosure. Moreover, the wiper motor 32 can be connected to a fastening element on the vehicle.

The wiper blade 2 is in the shape of a wedge, wherein one end of the upper part 10 at an outer connection position 34 is firmly joined to an end of the lower part 12. The other respective end of the upper part 10 and the lower part 12 is fastened at the fastening part on the wiper blade side.

In FIG. 5A, the wiper blade 2 is represented in its position not placed against the window, so that the lower part 12 is essentially straight in configuration. According to yet other embodiments, which can be combined with other embodiments, the lower part in the unloaded state is convex in configuration, i.e., with a curvature which projects away from the upper part in a middle region. The windshield wiping device according to the embodiments described here can typically take on the corresponding concave shape of the lower part, adapting to a window, upon making contact with the window and starting from the convex shape of the lower part.

Figure 6:
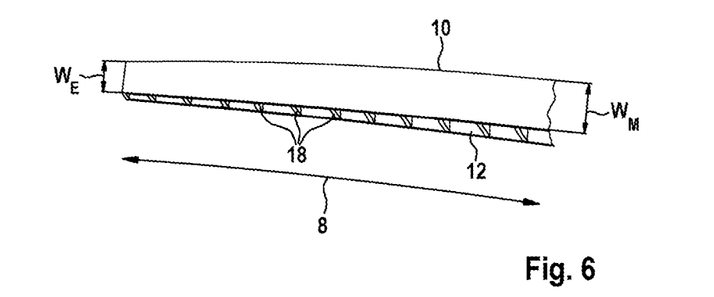

FIG. 6 is a schematic perspective representation of a wiper blade 2 of a windshield wiping device according to embodiments of the disclosure. As shown in FIG. 6, the wiper blade 2 has an outer width WE at the outer connection positions where the ends of the elongated upper part 10 and the lower part 12 are joined to each other. According to typical embodiments, the outer width WE is at least 15 mm, especially at least 20 mm, in particular at least 25 mm.

According to embodiments of the disclosure, which can be combined with other embodiments, the width of the wiper blade 2 increases from the outer connection positions in the direction of the mounting unit 30 or the support on which the wiper blade can be attached to the window wiping arm. In FIG. 6, for example, an inner width is designated as WM. According to typical embodiments, the inner width WM is at least 20 mm, especially at least 25 mm, especially at least 30 mm.

Figure 7:
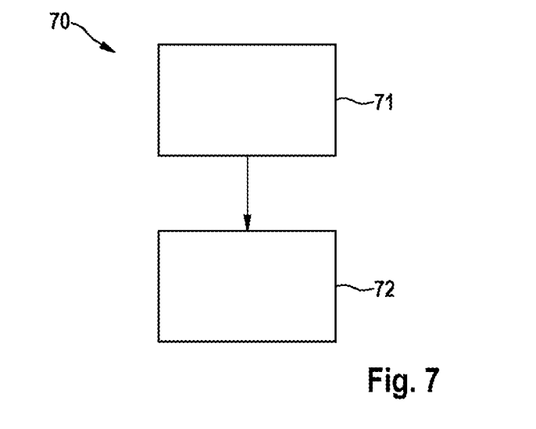

In order to illustrate embodiments of the method 70 for the mounting of a windshield wiping device, FIG. 7 shows a flow chart. According to embodiments of the method 70, the method 70 involves providing 71 a windshield wiping device according to the embodiments described herein. Moreover, the method involves introducing 72 the first engagement element and the second engagement element into one another by a movement essentially perpendicular to the lengthwise dimension of the wiper blade.

Thus, thanks to the embodiments described herein of the windshield wiping device and the method for the mounting of the windshield wiping device, a windshield wiping device is provided which can be mounted and dismounted in easy manner. Accordingly, the windshield wiping device can be easily replaced in the case of damage or removed in easy fashion before driving through a car wash and then be mounted back in place. Moreover, the windshield wiping device according to the embodiments described here can be produced easily, economically, and with low material outlay.

What is claimed is:

1. A windshield wiping device comprising:
    a mounting unit (41, 60), wherein the mounting unit (41, 60) has a first engagement element (42, 61), and
    a wiper blade (2) with
        an elongated upper part (10), which is at least partly bendable,
        an elongated lower part (12), which is at least partly bendable,
        a plurality of connection elements (18) connecting the upper part (10) and the lower part (12), wherein the connection elements (18) are spaced apart from each other along a lengthwise dimension (8) of the wiper blade (2) and wherein the connection elements (18) are configured to enable a movement of the upper part (10) and the lower part relative to each other with a movement component along the lengthwise dimension (8) of the wiper blade (2), and
        a wiper blade-side fastening part (43, 51) at a wiper blade side, wherein the wiper blade-side fastening part (43, 51) has a second engagement element (44, 52), and wherein the first engagement element (42, 61) and the second engagement element (44, 52) are configured to be introduced into one another such that the wiper blade (2) is fastened to the mounting unit (41, 60) by a single movement essentially perpendicular to both the lengthwise dimension (8) and to a vertical dimension, wherein the vertical dimension is perpendicular to a windshield;

wherein the first engagement element (42) includes a recess having a trapezoidal shape, and the second engagement element (44) includes a projection having a trapezoidal shape, such that the first engagement element (42) and the second engagement element (44) are interlocked with one another in a positive engagement when the projection is slid into the recess.

2. The windshield wiping device (40, 50) as claimed in claim 1, wherein the first engagement element (42, 61) and the second engagement element (44, 52) also form a force closure.

3. A method (70) for the mounting of a windshield wiping device, the method comprising:

providing (71) a windshield wiping device (40, 50) as claimed in claim 1, introducing the first engagement element (42, 61) and the second engagement element (44, 52) into one another by a movement essentially perpendicular to the lengthwise dimension (8) of the wiper blade (2).

4. The windshield wiping device (40) as claimed in claim 1, wherein the recess extends entirely through the mounting unit (41).

5. The windshield wiping device (40) as claimed in claim 4, wherein the recess extends from one side wall of the mounting unit (41) to an opposite side wall of the mounting unit (41).

6. A windshield wiping device comprising:

a mounting unit (41, 60), wherein the mounting unit (41, 60) has a first engagement element (42, 61), and a wiper blade (2) with an elongated upper part (10), which is at least partly bendable, an elongated lower part (12), which is at least partly bendable, a plurality of connection elements (18) connecting the upper part (10) and the lower part (12), wherein the connection elements (18) are spaced apart from each other along a lengthwise dimension (8) of the wiper blade (2) and wherein the connection elements (18) are configured to enable a movement of the upper part (10) and the lower part relative to each other with a movement component along the lengthwise dimension (8) of the wiper blade (2), and a wiper blade-side fastening part (43, 51) at a wiper blade side, wherein the wiper blade-side fastening part (43, 51) has a second engagement element (44, 52), and wherein the first engagement element (42, 61) and the second engagement element (44, 52) are configured to be introduced into one another by a movement essentially perpendicular to the lengthwise dimension (8), wherein the first engagement element and the second engagement element are each trapezoidal-shaped.

* * * * *